United States Patent [19]
McMurtry

[11] 3,802,799
[45] Apr. 9, 1974

[54] VALVE FOR FOLLOW-UP SERVO MECHANISM

[75] Inventor: David Roberts McMurtry, Bristol, England

[73] Assignee: Rolls-Royce (1971) Limited, London, England

[22] Filed: June 27, 1972

[21] Appl. No.: 266,682

[30] Foreign Application Priority Data
July 6, 1971 Great Britain.................. 31518/71

[52] U.S. Cl. ............................................. 416/157
[51] Int. Cl.............................................. B63h 1/06
[58] Field of Search.................................. 416/157

[56] References Cited
UNITED STATES PATENTS

| | | | |
|---|---|---|---|
| 2,801,068 | 7/1957 | Deriaz................................. | 416/157 |
| 3,367,424 | 2/1968 | Fukasu et al. ...................... | 416/157 |
| 3,663,119 | 5/1972 | Brooking............................ | 416/157 |
| 3,690,788 | 9/1972 | Pedersen............................. | 416/157 |

*Primary Examiner*—C. J. Husar
*Attorney, Agent, or Firm*—Stevens, Davis, Miller & Mosher

[57] ABSTRACT

In a follow-up servo mechanism there is provided a valve having a part which can rotate and a part which is moved linearly. The valve forms part of a fluid flow path between a source of pressure fluid and a motor. The linearly movable part of the valve has slots in its surface inclined to the valve axis, the rotary part has bores communicating between the slots and the motor and is connected to the motor to move therewith. The arrangement is such that linear movement of the one part puts the source of fluid into communication with the motor through the bores and slots, the motor thus rotates and rotary movement of the rotary part of the valve connected to the motor takes the bores and slots out of communication and stops the motor in its new position.

6 Claims, 3 Drawing Figures

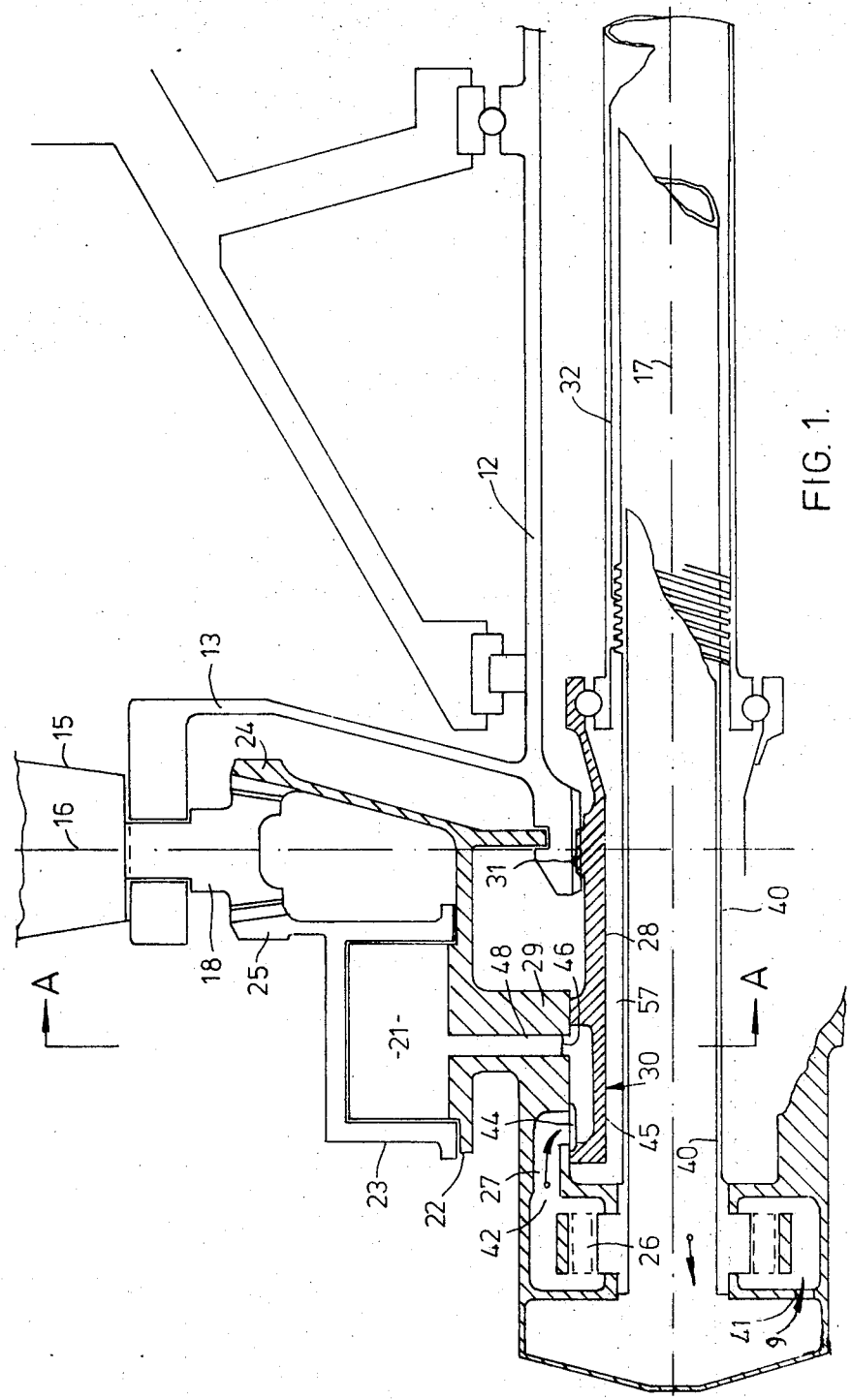

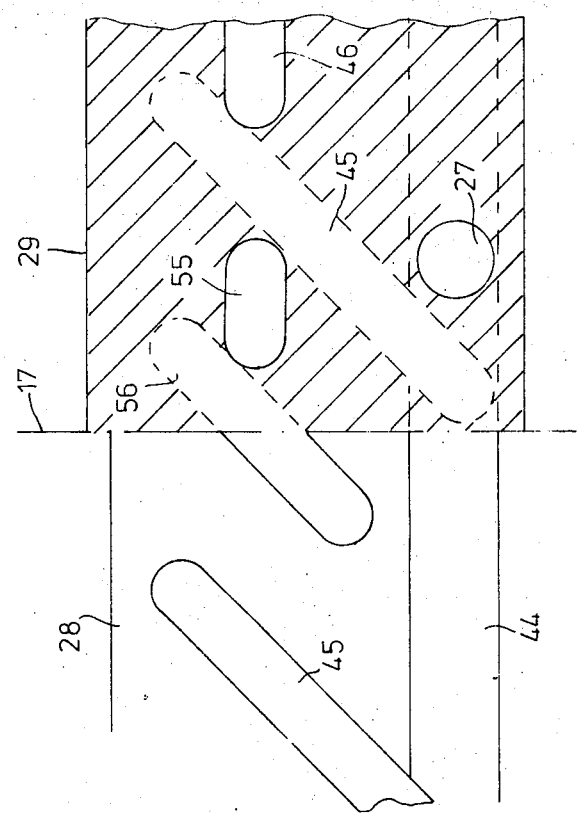
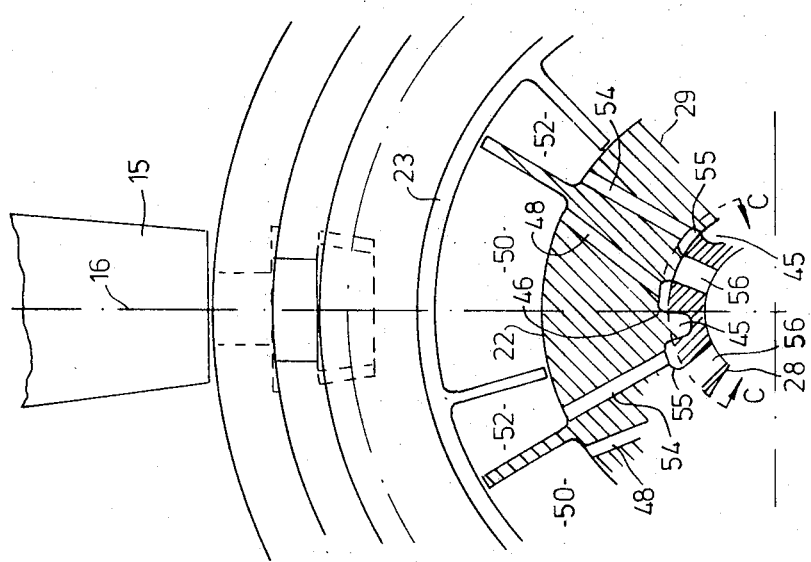
FIG. 3.
FIG. 2.

VALVE FOR FOLLOW-UP SERVO MECHANISM

The present invention relates to a valve for a follow-up servo mechanism.

It is known to have follow-up servo mechanisms in which linear movement of one part of the mechanism produces a linear follow-up motion in another part of the mechanism, or alternatively in which rotary movement of one part of the mechanism produces rotary follow-up movement in another part of the mechanism.

It is convenient, in some cases where follow-up motion is needed, to have a mechanism in which an initial linear movement in one part of the mechanism will produce a rotary follow-up motion in another part of the mechanism.

According to the present invention there is provided a follow-up servo mechanism comprising a fluid pressure motor, and a valve, the valve having two concentric cylindrical members, one of which is capable of a linear movement, the other of which is capable of a rotary movement, one of the members having at least one slot in the cylindrical surface thereof, said slot being inclined to the axis of the member and forming part of a flow path for pressurised fluid from a source to the motor, the other member having at least one bore therethrough which completes said fluid flow path when the bore and slot are moved into communication with each other, a first one of the members being connected to a part of the motor so that its said movement is caused by movement of the motor part, said movement of the second one of the members being caused by an operating device, the arrangement being such that said movement of the second one of the members brings the port and slot into communication thus supplying fluid to the motor to operate it and thus causing said movement of the first valve member to take the port and slot out of communication.

Preferably there are a plurality of slots and bores in the respective members, and the slotted member communicates with the source of pressure fluid.

The slots may extend completely through the wall of the said one member and the pressure fluid may thus be supplied from a source on the radially inward side of the member, or the slots may extend only partly into the surface of the said member and may thus be supplied with pressure fluid from one axial end thereof.

In a preferred form of the invention the member which is connected to the motor is formed integrally therewith.

In one embodiment of the invention the fluid pressure motor is a vane motor having two concentric relatively rotatable rotors each having a plurality of angularly spaced apart vanes, the vanes being interdigitated to form a plurality of chambers into which pressure fluid may be introduced to operate the motor. The valve may thus have a further slot or slots and further bores through each of the valve members to provide a second fluid flow path to drain the chambers on one side of each of the vanes of one of the motor rotors when the chamber on the other side of said vanes are supplied with pressure fluid.

In a particular application of the invention to a mechanism for varying the pitch (angle of attack) of the blades of a bladed rotor, the vane motor causes rotation of the blades about their longitudinal axes.

One embodiment of a follow-up servo valve according to the invention will now be described, by way of example only, with reference to the accompanying drawings in which:

FIG. 1 shows diagrammatically an axial section of a variable pitch fan assembly which includes a follow-up valve mechanism of the present invention.

FIG. 2 is a section on line A—A of FIG. 1.

FIG. 3 is an enlarged development of a section on line C—C of FIG. 2.

FIG. 1 shows a variable pitch fan assembly comprising a drive shaft 12 connected to drive a hub 13 to support fan blades 15 for rotation about axes 16 radially disposed to the axis 17 of the drive shaft 12. A bevel gear 18 is secured to each fan blade. Rotation of the fan blades about the axes 16 is accomplished by means of a pitch change mechanism which includes a vane motor 21 having an integrally vaned piston 22 and an integrally vaned cylinder 23, which are connected respectively to two crown wheels 24 and 25 concentric with the axis 16, and engaging the gears 18 at diametrically opposed sides thereof.

The vane motor is actuated by fluid supplied under pressure from a pump 26 through a passage 27 and a valve 30 to chambers 50 (See FIG. 2) of the vane motor. The valve 30 consists of a first valve member 28 and a second valve member 29. The valve members control the fluid flow to the vane motor. The first valve member 28 is connected to the drive shaft 12 to rotate together therewith by means of straight splines 31, and the second valve member 29 is integral with the vane motor piston 22. By reason of the engagement of the crown wheels 24 and 25 with the bevel gears 18, the vane motor 21 together with the second valve member rotate with the drive shaft 12. The first valve member is connected to operating means 32 in order to be moved axially relative to both the drive shaft and the second valve member.

The flow path for the high pressure fluid from the pump to the vane motor and back to a scavenge circuit is as follows:

The pump 26, which may be of any suitable type, but is conveniently a pump of the type known as GEROTOR pump in this example, draws in oil from a central tube 40 and into an inlet 41. The fluid leaves a high pressure outlet at 42 and passes into the passage 27 in the second valve member 29.

From the passage 27 it flows into an annular groove 44 which is always in communication with a plurality of circumferentially spaced-apart, elongated H.P. slots 45 which are formed in the radially outer surface of the first (inner) valve member 28, and are inclined to the axis 17 of the drive shaft and of the valve member 28, (see FIG. 3).

The slots extend sufficiently far along the axis of valve member 28 to enable them to communicate, when required, with a plurality of angularly spaced-apart, elongated slots 46 in the radially inner surface of the second valve member 29, which also forms the piston of the vane motor 21. All the slots 46 are formed at the radially inner ends of bores 48 which communicate with the vane motor chambers 50 on the same side of each vane of the piston, between said vane and the adjacent vane on the cylinder in, for example, the anticlockwise direction as seen in FIG. 2.

As pressure fluid is supplied to one side of all the vanes, the chambers on the other side of the vanes must be vented to a scavenge system, and for this purpose a second plurality of angularly spaced apart bores 54 are provided in the second valve member. The bores 54 alternate with the bores 48 and each communicate at one end with the chambers 52 in the vane motor on opposite sides of the vanes to chambers 50, and at the other end with elongate slots 55 angularly spaced around the inner surface of the second valve member between the slots 46.

When the high pressure fluid is in communication with chambers 50, chambers 52 are put into communication with the scavenge system through a second plurality of angularly spaced apart elongate slots 56 inclined to the valve axis 17 and disposed alternately with the slots 45. The slots 56 extend right through the first valve member 28 so as to communicate with a space 57 between the valve member and the inner supply tube 40, from which it is scavenged by means not shown.

It can be seen therefore, that axial movement of the first valve member in either direction, will put the high pressure oil supply from slots 45 into communication with one or other of the chambers in the motor through slots 46 or 55, and the other chamber into communication with the scavenge system through slots 56. The high pressure fluid operates the motor and rotates both piston 22 and the cylinder 23 to rotate the vanes. Rotation of the piston 22 which incorporates the second valve member 29 will then reduce the amount of communication the high pressure oil supply slots with the slots 46 or 55, until there is no longer any communication between any of the slots for example as shown in FIG. 3, but now with the pitch of the fan blades in the new position.

I claim:

1. A follow-up servo mechanism comprising a fluid pressure motor and a valve, the valve having two concentric cylindrical members one of which is capable of a linear movement, the other one of which is capable of a rotary movement, one of the members having at least one slot in the cylindrical surface thereof, said slot being inclined to the axis of the member and forming part of a flow path for pressurised fluid from a source to the motor, the other member having at least one bore therethrough which completes said fluid flow path when the bore and slot are moved into communication with each other, a first one of the members being connected to a part of the motor so that its said movement is caused by movement of the motor part, said movement of the second one of the members being caused by an operating device, the arrangement being such that said movement of the second one of the members brings the bore and slot into communication thus supplying fluid to the motor to operate it and thus causing said movement of the first valve member to take the bore and slot out of communication.

2. A servo mechanism according to claim 1 and wherein there are a plurality of slots in said slotted member and a plurality of bores in the other member, and all the slots communicate with the source of pressurised fluid.

3. A servo mechanism according to claim 2 wherein the slots extend only partly into the surface of the wall of the slotted member and means are provided for supplying the slots with pressurised fluid from one axial end thereof.

4. A servo mechanism according to claim 1 and wherein the fluid pressure motor comprises a vane motor having two concentric relatively rotatable rotors each having a plurality of angularly spaced apart vanes, the vanes being interdigitated to form a plurality of chambers into which pressure fluid is introduced to operate the motor and said first one of the valve members forms an integral part of one of the rotors of the vane motor.

5. A servo mechanism according to claim 4 and wherein the valve members are provided with a second plurality of slots and bores respectively to provide a fluid flow path between the motor and a scavenge system for draining the chambers on one side of each of the rotor vanes when the chambers on the other sides of the vanes are being supplied with pressurised fluid.

6. A pitch changing mechanism for a rotor having variable pitch blades and including a servo-mechanism according to claim 1.

* * * * *